United States Patent [19]

Kanegawa

[11] Patent Number: 4,681,475

[45] Date of Patent: Jul. 21, 1987

[54] BALL JOINT SOCKET

[75] Inventor: Kiyoharu Kanegawa, Hamamatsu, Japan

[73] Assignee: Rhythm Motor Parts Mfg. Co., Ltd., Japan

[21] Appl. No.: 844,200

[22] Filed: Mar. 26, 1986

[51] Int. Cl.⁴ ............................................. F16C 11/00
[52] U.S. Cl. ...................................... 403/40; 403/135
[58] Field of Search .............................. 403/135, 140; 29/149.5 B

[56] References Cited

U.S. PATENT DOCUMENTS 2,635,906  4/1953  Graham et al. .................. 403/135 X
4,286,363  9/1981  Morin ............................. 29/149.5 B

FOREIGN PATENT DOCUMENTS 1417407  12/1975  United Kingdom ................ 403/140

Primary Examiner—Andrew V. Kundrat
Attorney, Agent, or Firm—Lane and Aitken

[57] ABSTRACT

A ball joint socket of a ball joint of a motor vehicle comprising a bearing holding the ball joint and a ball shell integral with a caulking portion, wherein the caulking portion is smaller in thickness than the ball shell, and the caulking portion is bent so that the ball joint is prevented from escaping from the ball joint socket.

3 Claims, 8 Drawing Figures

BALL JOINT SOCKET

FIELD OF THE INVENTION

The present invention relates in general to a ball joint socket of a ball joint of a motor vehicle and in particular to an improvement in configuration of a caulking portion of the ball joint socket.

SUMMARY OF THE INVENTION

In accordance with an important aspect of the present invention, there is provided a ball joint socket of a ball joint of a motor vehicle comprising a bearing holding the ball joint and a ball shell integral with a caulking portion, wherein the caulking portion is smaller in thickness than the ball shell, and the caulking portion is bent so that the ball joint is prevented from escaping from the ball joint socket.

BRIEF DESCRIPTION OF THE DRAWINGS

The drawbacks of a prior art ball joint socket and the advantages and features of a ball joint socket according to the present invention will more clearly understood from the following description taken in conjunction with the accompanying drawings in which.

DESCRIPTION OF THE PRIOR ART

Figure 5:
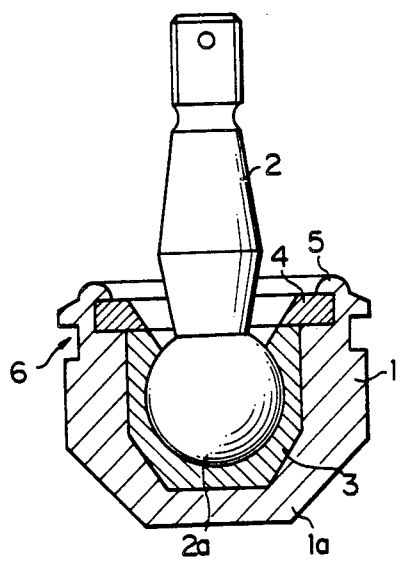
FIG. 5 is a cross sectional view of a ball joint socket of the prior art.

Referring to FIG. 5 of the accompanying drawings, there is shown a prior art ball joint socket designated by reference numeral 1. The ball joint socket 1 includes a ball shell 1a with a caulking portion 5 at its upper end. The ball shell 1a of the ball joint socket 1 is formed with a bore in which the ball end 2a of a ball stud 2 and a bearing 3 holding the ball end 2a are held through a press plate 4 received in an annular groove formed in the caulking portion 5. The ball shell 1a of the ball joint socket 1 is further formed at its outer surface with a dust cover groove 6.

Figure 6:
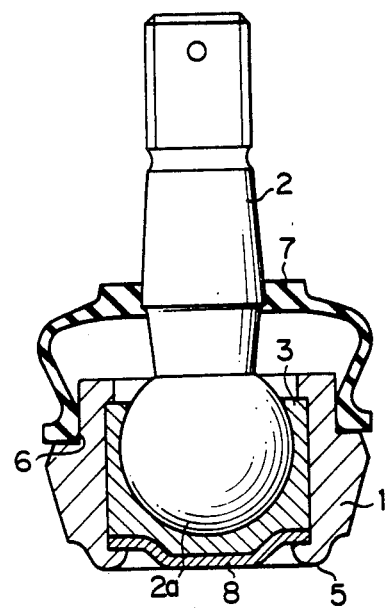
FIG. 6 is a cross sectional view of another prior art ball joint socket.

FIG. 6 illustrates another prior art ball socket. The ball shell of this type is formed at its lower end with the caulking portion 5 and at its upper end with a recess 6 for mounting a dust cover 7. The ball end 2a of the ball stud 2 is held in the ball socket 1 through an end plate 8 by the lower caulking portion 5.

However, in these prior art ball joint sockets the press plate 4 or the end plate 8 is caulked by one end of the ball shell 1a of the ball joint socket 1 and the ball shell 1a is formed with a plurality of grooves. Therefore, such prior art ball joint socket has the disadvantage that a number of parts are required, the caulking portion is structurely complex and the socket is expensive.

Figure 7:
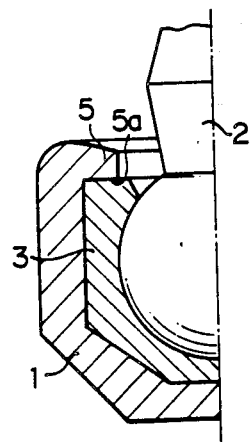
FIG. 7 is a part-enlarged view showing the caulking portion of the ball shell of another prior art ball joint socket.

As shown in FIG. 7, the bearing 3 can be press fitted in the ball joint socket 1 by the flanged caulking portion 5. However, when the caulking portion is bent at right angle, the flanged caulking portion 5 is deformed, particularly at the inner face 5a and at the inner surface of the ball shell because the flanged caulking portion and the ball shell have the same thickness. If pressure acting on the bearing 3 is varied due to the error of thickness of the flanged caulking portion 5, fluctuation in torque of the ball stud 2 becomes large because the bearing 3 is pressed in the axial and radial directions by the deformed inner face 5a of the flanged caulking portion 5.

It is accordingly an important object of the present invention to provide an improved ball joint socket which is light in weight, structurally simpler and less expensive.

Another important object of the present invention is to provide an improved ball joint socket which can prevent fluctuation in torque of the ball stud.

DESCRIPTION OF THE PREFERRED EMBODIMENT

Figure 1:
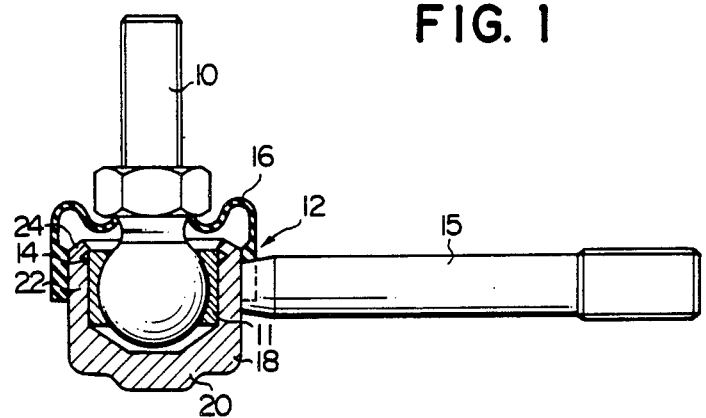
FIG. 1 is a cross sectional view of a ball joint socket constructed in accordance with an embodiment of present invention.
Figure 2:
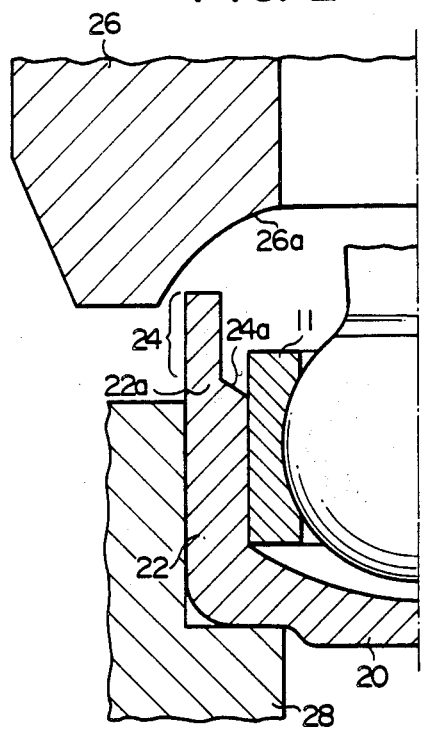
FIG. 2 is a part-enlarged view showing the ball shell of the ball joint socket shown in FIG. 1.
Figure 3:
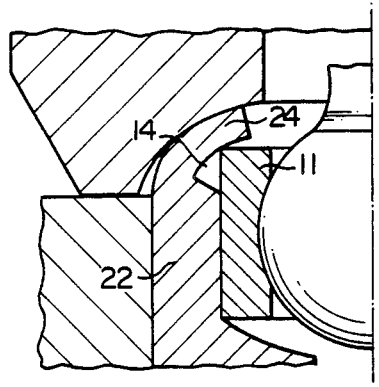
FIG. 3 is a part-enlarged view showing the caulking portion of the ball shell of the ball joint socket which is bent by means of a press and back-up jig assembly.

Referring to FIGS. 1, 2 and 3 of the accompanying drawings, a ball joint socket constructed in accordance with one embodiment of the present invention is generally designated by reference numeral 12. In FIG. 1 reference numeral 10 designates a ball stud, reference numeral 11 designates a bearing, reference numeral 15 designates a tie rod, and reference numeral 16 designates a dust cover.

The ball joint socket 12 comprises a ball shell 18 having a base portion 20, a cylindrical wall portion 22 extending upwardly from the base wall portion 20, and a caulking portion 24 formed at an upper end 22a of the cylindrical wall portion 22 and smaller in thickness than the cylindrical wall portion 22. The caulking portion 24 is arcuately bent by a press jig 26 with an arcuately shaped or a conical surface 26a and a back-up jig 28 so that the bearing 11 and the ball stud 12 are prevented from escaping from the ball joint socket 12. At the same time an annular interstice indicated at 14 is formed between the acuately bent caulking portion 24 and the upper end of the bearing 11. In this embodiment it is preferable that a lower face 24b of the caulking portion 24 be inclined at about 45 degrees.

Figure 4A:
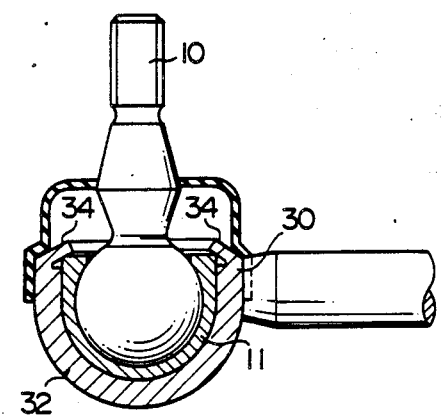
FIG. 4A is a cross sectional view of a ball joint socket constructed in accordance with another embodiment of present invention.
Figure 4B:
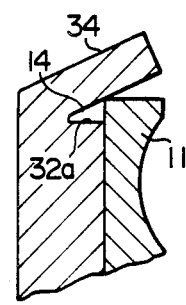
FIG. 4B is a part-enlarged view showing the caulking portion of the ball shell of the ball joint socket which is bent by means of a press and back-up jig assembly.

FIGS. 4A and 4B show a ball joint socket 30 constructed in accordance with another embodiment of the present invention. In this embodiment a ball shell 32 of the ball joint socket 30 is of a substantially semi-spherical configuration. The ball shell 32 is formed at its upper end with a caulking portion 34 smaller in thickness than the ball shell 32. The caulking portion 24 is bent by a press jig with a conical surface and a back-up jig so that it diagonally extends in linear fashion in relation to an upper flat end 32a of the ball shell 32 as shown in FIG. 4B. In this embodiment it is easier to manufacture the press jig and the back-up jig.

The operation of the ball joint socket constructed in accordance with the present invention will hereinafter be described.

The caulking portion of the ball shell is inwardly bent by the press jig. In this instance since the caulking portion is smaller in thickness than the cylindrical wall portion, only the caulking portion is bent and the cylindrical wall portion does not vary in thickness. In addition, since the annular interstice is formed between the acuately bent caulking portion and the upper end of the bearing, no pressure in the radial direction is imposed on the upper end of the bearing. Accordingly, the bearing holding the ball stud is supported under uniform pressure by the ball joint socket according to the present invention.

From the foregoing description, it will be seen that an improved ball joint socket which is light in weight, structurally simpler, and less expensive and can prevent fluctuation in torque of the ball stud is afforded by the present design.

While certain representative embodiments and details have been shown for the purpose of illustrating the present invention, it will be apparent to those skilled in this art that various changes and modifications may be made therein without departing from the spirit and scope of the present invention.

What is claimed is:

1. A ball joint socket of a ball joint of a motor vehicle comprising a bearing holding said ball joint and a ball shell integral with a caulking portion smaller in thickness than said ball shell, wherein
said caulking portion is bent to engage said bearing so that said ball joint is prevented from escaping from said ball joint socket and that an annular interstice is formed between an inner surface of said caulking portion and an outer peripheral surface of an upper end of said bearing radially outside of the point of engagement of said caulking portion with said bearing.

2. A ball joint socket as set forth in claim 1, in which said ball shell has a base portion, and a cylindrical wall portion extending upwardly from said base portion and integral with said caulking portion.

3. A ball joint socket as set forth in claim 1, in which said ball shell is of a substantially semi-spherical configuration.

* * * * *